April 5, 1955 M. M. TRIPLETT 2,705,606
RESILIENT FOOT FOR A METER MECHANISM
Filed Jan. 14, 1952
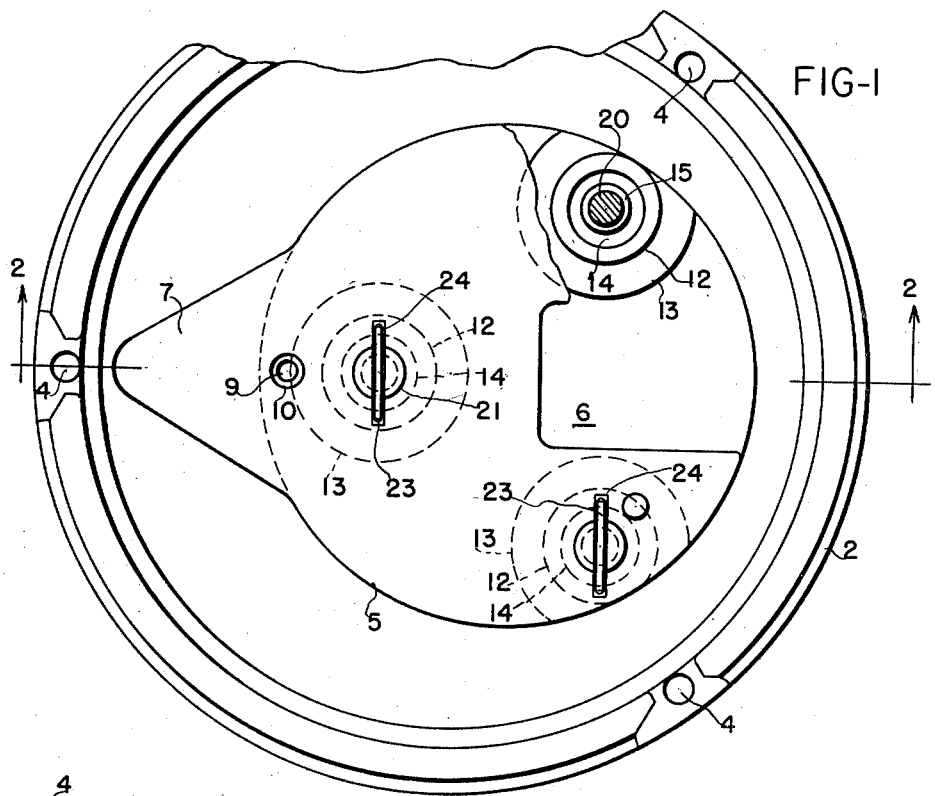
INVENTOR
MILO M. TRIPLETT
BY Toulmin & Toulmin
ATTORNEYS

United States Patent Office 2,705,606
Patented Apr. 5, 1955

2,705,606
RESILIENT FOOT FOR A METER MECHANISM

Milo M. Triplett, Bluffton, Ohio, assignor to The Triplett Electrical Instrument Company, Bluffton, Ohio, a corporation of Ohio Application January 14, 1952, Serial No. 266,376

1 Claim. (Cl. 248—358)

This invention relates to electrical measuring instruments and particularly to devices of this character employed for military purposes and which are subjected to extreme shock or vibration when in use or in shipment.

Various ways have been devised to shock-proof the meter mechanism, and heretofore mounts made of ordinary rubber have been used for this purpose. However, it has been found that this method is only fairly satisfactory in that the degree of flex in the rubber changes with temperature and therefore the degree of the shock mounting changes accordingly. Moreover, control and reproducibility of the resilience of the rubber is not altogether an easy problem, more especially in view of the critical requirements of the mount and the tendency of the ordinary kinds of rubber to vary in physical content and texture. Such rubber sometimes contains foreign elements which under certain conditions release corrosive fumes, thereby attacking the delicate instrument parts.

Finally, the use of rubber and other resilient materials tends to curtail the freedom of movement of the supported elements in one or more directions and thereby are not able to support any vibration or shock imparted in that direction.

The primary object of the invention is to provide a shock mount for an electrical measuring instrument consisting mainly of metal parts, thus eliminating the need for any appreciable amounts of rubber and similar material.

Another object is to provide a resilient mount for an electrical measuring device which is of a reproducible and predetermined character and in which the resilience is constant throughout the operating life of the device.

Still another object is to provide an all-metal form of resilient mount in which the material of the mount is devoid of corrosive fumes, gases and other material having deleterious effects on the parts of the instrument.

Another object is to provide a resilient support for the operating mechanism of an electrical measuring instrument, which support permits universality of movement of the member with respect to the casing of the instrument.

Still another object is to provide a resilient mount for the main support plate of an electrical measuring instrument and in which the mount comprises a plurality of springy elements constituted entirely of metal and adapted to be made on a quantity production basis.

Another object is to provide support elements of a resilient character for supporting the main plate of the instrument from the casing and in which the amount of resilience in the supports can be accurately predetermined and reproduced in order to accommodate parts of different sizes and weights of a number of instruments.

A further object is to provide a shock-proof mount for the operating mechanism of an electrical measuring instrument in which the mount is formed of a post attached to the support plate of the instrument and the post is supported from the instrument casing in a manner as to permit universal movement.

Another object is to provide a shock-proof mount for the operating mechanism of an electrical measuring instrument in which the posts for supporting the plate which carries the operating parts are resiliently held in position by springs or by rubber or by a combination of both.

Other objects and features will be apparent as the specification is perused in connection with the accompanying drawings, in which:

Figure 1 represents a plan view of an instrument casing with the operating parts including the needle, magnets, rotor, etc., removed for clearness;

Figure 2 is a vertical sectional view, partly in elevation, showing the interior of the casing including the support plate on which the operating parts are mounted;

Figure 3 is a fragmentary sectional view of a modified form of the resilient mount; and Figure 4 is another fragmentary sectional view but showing a still further modification of the improved mount.

Referring to the figures, reference character 1 designates a cylindrical casing made of metal, hard rubber or any other suitable material, the casing being provided at the top with an annular lip 2 and closed at the bottom, as indicated at 3, except for an opening (not shown) through which the leads of the instrument are taken. Openings 4 are provided around the tip of the casing so that the instrument can be screwed to a switchboard or panel (not shown).

The support plate 5 on which the various operating parts are mounted may take any suitable shape, but as indicated, is of a general circular design having a rectangular opening at 6 and being provided with a triangular extension 7 at the other side. This opening is for the purpose of allowing clearance for the lower part of the bridge structure which supports the lower jewel bearing (not shown).

Instruments of this general character include many delicate operating parts including a wound rotor which is suspended between jewel bearings and is adapted to rotate within a set of magnet plates which constitute pole pieces (not shown). The rotor is provided with a needle which swings across the face of the instrument.

A dial plate and window are also provided. These magnets are usually held in position by a brass plate at the top, the magnets and the plate being riveted together. The entire magnetic assembly is secured to the support plate 5 by means of two bolts of which one, 8, has been illustrated, and also by means of a screw equidistantly spaced from the bolts (not shown). The bolts are threaded as indicated at 9 into the plate. The latter comprises an insulating material such as hard rubber, especially prepared Bakelite plastic, etc., so that it may be desirable to provide a metal sleeve 10 which is threaded in order to receive the screw for holding the magnets and the brass plate together. Thus, the operating parts of the instrument are secured to the plate 5.

An instrument of this character must be handled with great care for otherwise the aligned jewel bearings would be knocked out of place and thereby become misaligned or damaged to add to the friction of the rotor and the needle that it carries. The wound rotor is also delicate and sometimes even vibrations of appreciable amplitude are sufficient to permanently injure these delicate rotating parts of the instrument, particularly in the case of the smaller devices in which extremely narrow tolerances and clearances are present.

It is therefore essential to mount the plate 5 resiliently and it has been the practice in the past to use rubber pillars for this purpose, which while they are satisfactory under certain conditions, in others, as in the case of extreme vibration or severe shock during shipment, will no longer serve to protect the delicate parts and the necessary accuracy of alignment of the rotating elements. Rubber has many other disadvantages such as releasing corrosive fumes and being unable to control the degree of flex of the material due to contained foreign matter or elements.

In accordance with my invention, there is provided an all-metal form of resilient mount which eliminates the rubber and any other spongy material.

To the bottom 3 of the casing there is first welded or soldered a thin metal sheet 11, preferably of circular configuration, this sheet serving as the support member for seals (not shown) through which conductors are taken, preferably of glass. These conductors lead to a wound rotor.

An inverted cup-shaped member 12 is provided having an outwardly extending lip 13 at the lower edge, which can be brazed or otherwise secured to the disc 11. The upper end of the cup-shaped element 12 is provided with an opening 14 of substantially less diameter than the interior diameter of the element. The purpose of this opening will be explained hereinafter.

Within the element 12, there is a spring mount comprising a metal sleeve 15 threaded on the interior as indicated at 16 and being provided with a shoulder 17 preferably positioned near the lower end of the sleeve. This sleeve is of substantially smaller diameter than the opening 14 and projects through that opening.

There is a pair of springs 18, 19 respectively, preferably of a conical shape, and having the ends of smaller diameter positioned on opposite sides of the shoulder 17 with the ends of larger diameter abutting the interior of the element 12 and the disc 11 respectively.

Thus the sleeve 15 is adapted to ride within the element 12 and can move either upwardly, downwardly or sideways by merely compressing the springs 18, 19. Inasmuch as the opening 14 is somewhat larger than the outer diameter of the sleeve, the latter is adapted to move sidewise so that, in fact, the sleeve has a universality of movement within the element 12. The plate 5 is caused to rest upon the upper surface of the sleeves 15 and is thereby resiliently supported through the medium of the springs 18, 19.

In order to prevent the support plate from moving with respect to the sleeve 15, screws 20 are provided which engage the threads within the sleeves and have heads 21. The latter are adapted to abut the shoulder 22 of the countersunk openings in the plate. To prevent the screws from working out through being unscrewed, if desired a pin 23 may be provided to pass through the slot in the head of the screw and to be received by a small rectangular groove 24 provided in the plate 5.

This groove may be sealed solid by wax or similar material in order to hold the pin in place. Thus the screw cannot turn until the wax has been removed and the pin 24 taken out of the groove.

As shown in Fig. 1, three of the structures which have been described in detail are provided, and are preferably equidistantly spaced beneath the plate 5. It will be further noted that all parts of the spring mount are made of metal and completely eliminates the use of any rubber.

It is apparent that by the use of the springs I am able to control the degree of flex very closely by changing the size or gauge of wire, number of turns and the hardness or resiliency of the metal. Thus the movement of an instrument can be resiliently supported on the plate 5 and the springiness of the mount can be varied accordingly by the proper choice of springs to take care of different weights. It is further apparent that considerable sidewise movement of the plate 5 is also possible on account of the fact that the sleeve 15 is given considerable play within the opening 14 and the springs permit sidewise movement.

An electrical measuring instrument provided with the improved form of shock mounts necessarily has a longer operating life than an instrument in which the resiliency of support is obtained solely by the use of rubber. The springs have a long useful life and obviously are capable of being temporarily distorted through wide angles without damage so that the instrument as a whole, including the delicate operating parts supported on the plate 5, can withstand severe shock or vibration.

An electrical measuring instrument provided with the improved form of shock mounts necessarily has a longer operating life than an instrument in which the resiliency of support is obtained solely by the use of rubber. The springs have a long useful life and obviously are capable of being temporarily distorted through wide angles without damage so that the instrument as a whole, including the delicate operating parts supported on the plate 5, can withstand severe shock or vibration.

While I have described my improved shock mount as being constituted entirely of metal with all of its attendant advantages, some of these advantages are still present when the springs are contained in a resilient insulating compound. The rubber serves to dampen the vibrations set up by high shock. Fig. 3 shows a modification of this character and the elements which are the same as those illustrated in Fig. 2 are given the same reference characters. The springs 18 and 19 are contained in a matrix 25 of resilient material such as silicone rubber. This material can be molded in position. The compound surrounds the interior and exterior of the springs, and yet will not perceptibly interfere with their vertical and sidewise movements.

Under certain circumstances, even the springs can be eliminated to obtain some advantages and resilient insulating material interposed between the shouldered sleeve and the cup member 12. This modification is shown in Fig. 4 in which the resilient material is indicated at 26.

Since the shoulder 17 is embedded in the rubbery mass and the latter molded in position, the sleeve is prevented from being removed from the cup member 12, and yet extreme elasticity is accorded the sleeve in all directions. Thus, in the modifications of Figs. 3 and 4, the plate 5 and its supported elements are made resistant to shock or vibration since the latter are absorbed either in the springs or in the resilient mass.

It will be understood that other modifications and arrangements in structure could be made without departing from the spirit of my invention and, accordingly, I desire to comprehend such modifications and substitutions of equivalents as may be considered to come within the scope of the appended claim.

Having thus fully described my invention, what I claim as new and desire to secure by Letters Patent, is:

A shockproof mount for an electrical measuring device comprising a metallic cylindrical element having an open end and internally flanged at the other end, an internally threaded shouldered sleeve member adapted to receive a supporting member contained within said cylindrical member and extending through said flanged end, means adapted to close said open end, the end of said sleeve member within said cylindrical element being spaced from said means, a first coil spring surrounding said sleeve member and having one end bearing against the shoulder and the other end bearing against said last-mentioned means, a second coil spring surrounding said sleeve member and having one end bearing against the shoulder and the other end bearing against the inner surface of said internal flange, and a matrix of resilient material closely surrounding said springs and encompassing said sleeve and interposed between said sleeve end and said means, said resilient material closely fitted within said cylindrical member.

References Cited in the file of this patent

UNITED STATES PATENTS

| Number | Name | Date |
|---|---|---|
| 620,812 | Ward | Mar. 7, 1899 |
| 712,904 | Byers | Nov. 4, 1902 |
| 1,462,276 | Grant | July 17, 1923 |
| 1,802,589 | Thompson | Apr. 28, 1931 |
| 2,256,752 | Saurer | Sept. 23, 1941 |
| 2,314,464 | Shaw | Mar. 23, 1943 |
| 2,319,735 | Hussman | May 18, 1943 |
| 2,359,917 | Hussman | Oct. 10, 1944 |
| 2,425,565 | Robinson | Aug. 12, 1947 |
| 2,520,442 | Schwartz | Aug. 29, 1950 |
| 2,538,658 | Saurer | Jan. 16, 1951 |
| 2,585,107 | Geldhof | Feb. 12, 1952 |
| 2,588,171 | Smith et al. | Mar. 4, 1952 |
| 2,605,099 | Brown | July 29, 1952 |